(12) United States Patent
Zheng et al.

(10) Patent No.: US 8,179,844 B2
(45) Date of Patent: May 15, 2012

(54) CHANNEL AWARE MULTIPLE USER MIMO SCHEME UNIFIED WITH SINGLE USER CLOSED LOOP MIMO

(75) Inventors: Hongming Zheng, Beijing (CN); Shanshan Zheng, Beijing (CN); May Wu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 919 days.

(21) Appl. No.: 12/183,317

(22) Filed: Jul. 31, 2008

(65) Prior Publication Data

US 2009/0074099 A1    Mar. 19, 2009

Related U.S. Application Data

(60) Provisional application No. 60/955,155, filed on Aug. 10, 2007.

(51) Int. Cl.
*H04W 4/00* (2009.01)
*H04W 72/00* (2009.01)

(52) U.S. Cl. ...... 370/329; 370/335; 455/450; 455/452.1

(58) Field of Classification Search .......... None
See application file for complete search history.

(56) References Cited

U.S. PATENT DOCUMENTS

| 7,636,573 | B2 * | 12/2009 | Walton et al. ............. 455/454 |
| 7,649,831 | B2 * | 1/2010 | Van Rensburg et al. ...... 370/203 |
| 7,720,173 | B2 * | 5/2010 | David et al. ............... 375/295 |
| 2007/0183380 | A1 | 8/2007 | Rensburg et al. |
| 2008/0049813 | A1 * | 2/2008 | Kurose et al. ............. 375/141 |
| 2008/0219376 | A1 * | 9/2008 | Qi et al. ................. 375/285 |

FOREIGN PATENT DOCUMENTS

| KR | 2007-0046755 A | 3/2007 |
| WO | 2006/099349 A1 | 9/2006 |
| WO | 2006/130866 A2 | 12/2006 |
| WO | 2009/023532 A2 | 2/2009 |
| WO | 2009/023532 A3 | 2/2009 |

OTHER PUBLICATIONS

PCT/US2008/072511, Notification Concerning Transmittal of International Preliminary Report on Patentability, Feb. 25, 2010, 6 pages.
International Search Report/Written Opinion received for PCT Application No. PCT/US2008/072511, mailed on Jan. 30, 2009, 10 Pages.

* cited by examiner

*Primary Examiner* — Robert Scheibel
(74) *Attorney, Agent, or Firm* — Cool Patent, P.C.; Kenneth J. Cool; Joseph P. Curtin (57) ABSTRACT

A base station is capable of unifying a single-user MIMO scheme with a multi-user MIMO scheme by receiving a Rank-1 CQI values from one or more subscriber stations. The base station also receives preceding vectors from the subscriber stations, and then determines which of the subscriber stations has a best Rank-1 CQI value. The base station then determines a beam forming matrix to use based at least in part on the vectors received from the subscriber station having the best Rank-1 CQI value. The base station then broadcasts data to the subscriber station using the beam forming matrix corresponding to the subscriber station having the best Rank-1 channel quality indicator to implement single-user MIMO in one or multiple streams to that subscriber station, or to the subscriber stations having the best Rank-2 channel quality indicators to implement multi-user MIMO in multiple streams.

17 Claims, 5 Drawing Sheets

CHANNEL AWARE MULTIPLE USER MIMO SCHEME UNIFIED WITH SINGLE USER CLOSED LOOP MIMO

CROSS REFERENCE TO RELATED APPLICATIONS

The present application claims the benefit of U.S. Provisional Application No. 60/955,155 filed Aug. 10, 2007. Said Application No. 60/955,155 is hereby incorporated herein by reference in its entirety.

BACKGROUND

Multiple user-multiple-input, multiple-output (MU-MIMO) schemes are drawing more and more attention in recent years in that MU-MIMO may provide both multi-user diversity and spatial diversity. The capacity of MU-MIMO may be much higher than single-user-MIMO (SU-MIMO), especially, for example, if the antenna configuration is asymmetric, for example, in a 4×2 arrangement or a 2×1 arrangement. An asymmetric configuration may occur when a base station (BS) has a greater number of transmit (Tx) antennas than the number of receive (Rx) antennas at the subscriber station (SS), or in a high-correlation channel condition. MU-MIMO differs from SU-MIMO in that MU-MIMO may involve the transmission of transmission streams for multiple users in one transmission function unit.

DESCRIPTION OF THE DRAWING FIGURES

Claimed subject matter is particularly pointed out and distinctly claimed in the concluding portion of the specification. Such subject matter may, however, be understood by reference to the following detailed description when read with the accompanying drawings in which:

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. Coupled may, however, also mean that two or more elements may not be in direct contact with each other, but yet may still cooperate and/or interact with each other. For example, "coupled" may mean that two or more elements do not contact each other, but are indirectly joined together via another element or intermediate elements. Finally, the terms "on," "overlying," and "over" may be used in the following description and claims. "On," "overlying," and "over" may be used to indicate that two or more elements are in direct physical contact with each other. "Over may, however, also mean that two or more elements are not in direct contact with each other. For example, "over" may mean that one element is above another element, but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
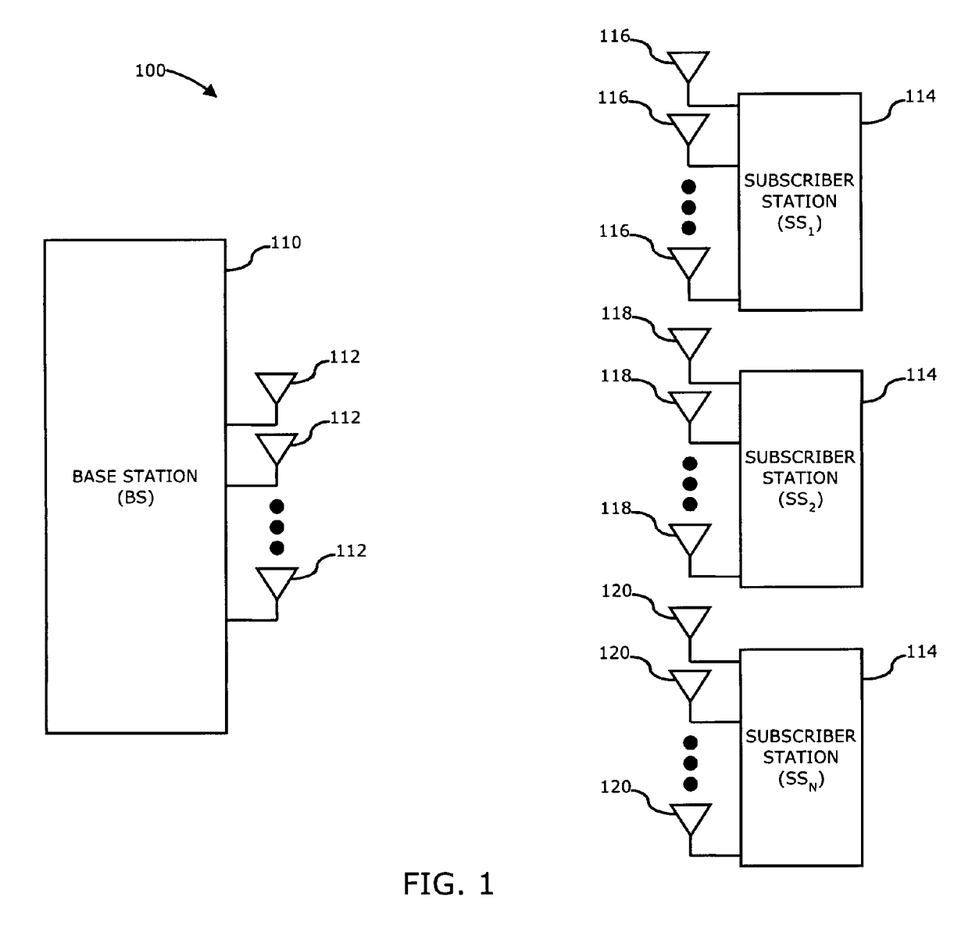
FIG. 1 is a block diagram of a MU-MIMO system in accordance with one or more embodiments.

Referring now to FIG. 1, a block diagram of a MU-MIMO system in accordance with one or more embodiments will be discussed. As shown in FIG. 1, MIMO system 100 may comprise a base station (BS) 110 and one or more subscriber stations (SS) 114, including a first subscriber station ($SS_1$), a second subscriber station ($SS_2$), up to N number of subscriber stations ($SS_N$) in which one or more of the subscriber stations 114 may wirelessly communicate with base station 110. In such a MIMO system 100, base station 110 may comprise multiple antennas 112, and the respective subscriber stations 114 may likewise have one or more antennas 116, 118, and/or 120. It should be known that the number one or more of subscriber stations 114 may have its own number of antennas, in which, for example, the number of antennas 116 of first subscriber station $SS_1$ may be different than the number of antennas 118 of second subscriber station $SS_2$, which both may be different than the number of antennas of an Nth subscriber station $SS_N$. Likewise, one or more of the subscriber stations 114 may have a different number of antennas than the number of antennas 112 of base station, although in some instances one or more of base station 110 and any one or more of subscriber stations 114 may have the same number of antennas, and the scope of the claimed subject matter is not limited in this respect. It should also be noted that the base station 110 and subscriber station 114 model shown in FIG. 1 is merely an example of an arrangement of MIMO system 100, and in one or more alternative embodiments base station 110 may itself be a subscriber station 114, and/or one or more of the subscriber stations 114 may communicate directly with another one or more of the subscriber stations 114, for example, in an ad hoc network arrangement or the like, and the scope of the claimed subject matter is not limited in this respect.

In one or more embodiments, communication between base station 110 and one or more of subscriber stations 114 may involve precoding, spatial multiplexing, and/or diversity encoding, alone or in combination. Furthermore, base station 110 may communicate directly with one of the subscriber stations 114 by directing all of its antenna resources to the respective subscriber station 114, for example, to achieve higher data rates, or alternatively base station 110 may divide some of its antennal resources between or more subscriber stations 114, for example, to optimize serving a greater number of subscriber stations 114. In one or more embodiments as will be discussed herein, MIMO system 100 may implement a channel-aware-multi-user-MIMO (CA-MU-MIMO) system. In such a channel-aware MIMO system 100, a precoding vector and/or the codebook index may be channel aware based at least in part on feedback received from one or more user, such as one or more of subscriber stations 114. In one or more embodiments, channel quality indicators (CQIs) corresponding to selected precoding vectors are fed back to base station 110 for user scheduling of the subscriber stations 114 in base station 110. The user scheduling in base station 110 may be based on one or more principles, for example, user orthogonality, or the maximization of proportional fairness metric, and so on. In one or more particular embodiments, two kinds of CQIs may be used, for example Rank-1 and Rank-2, for MIMO rank/mode adaptation. Interference-unaware Rank-1 CQIs may be used for the selection of the precoding vector, and interference-aware Rank-2 CQIs may be used for MIMO rank/link/mode adaptation and user selection. By using the same codebook as used in a single-user, closed-loop MIMO scheme, the channel-aware MU-MIMO scheme implemented by MIMO system 100 may be unified with a single-user closed-loop MIMO scheme. Such a MU-MIMO scheme is discussed in greater detail with respect to FIG. 2, FIG. 3, and FIG. 4, below.

Figure 2:
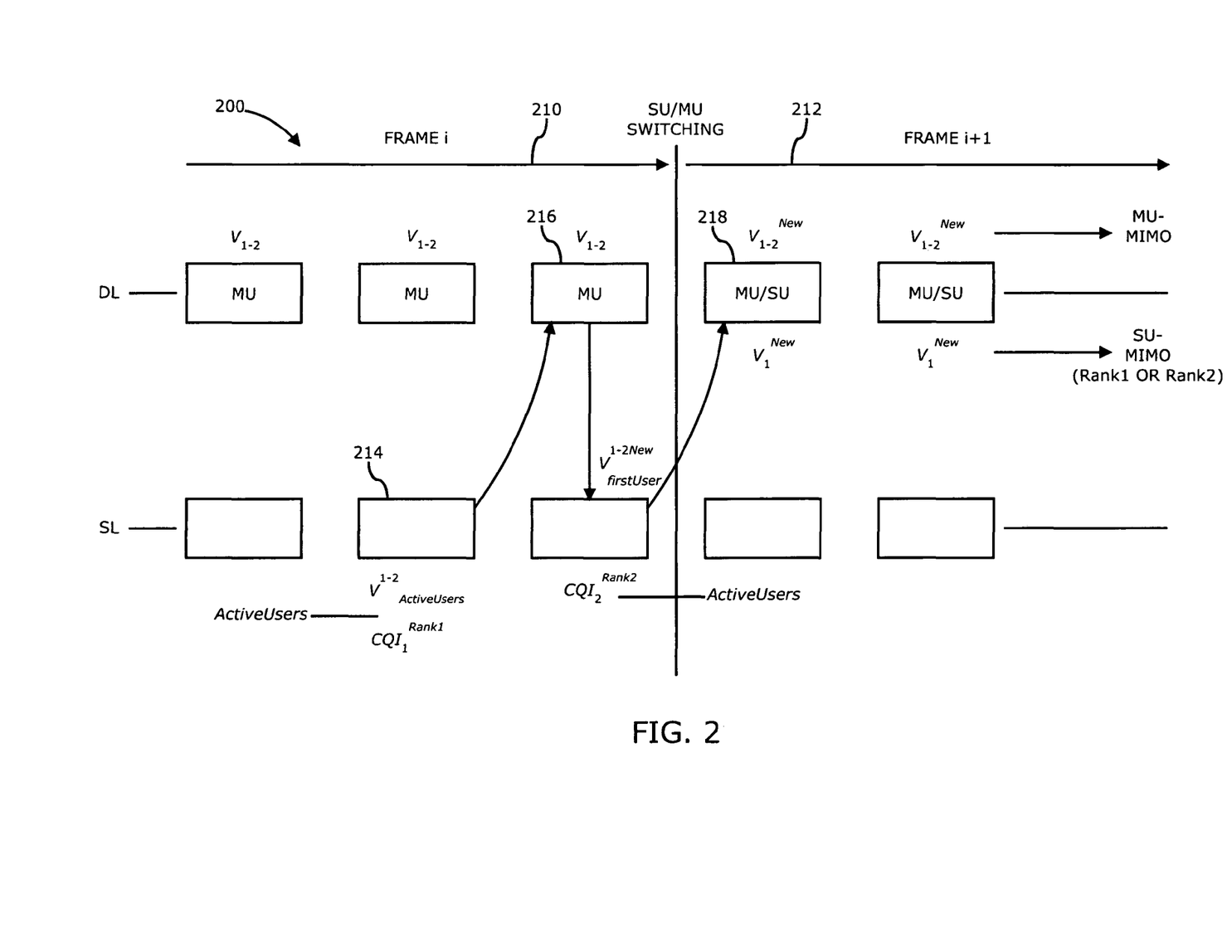
FIG. 2 is a diagram of a channel-aware MU-MIMO transmission scheme with multiple streams in accordance with one or more embodiments.

Referring now to FIG. 2, a diagram of a channel-aware MU-MIMO transmission scheme with multiple streams in accordance with one or more embodiments will be discussed. In the channel-aware MU-MIMO scheme 200 shown in FIG. 2, a transmission procedure capable of being implemented by base station 110 may be as follows for multiple streams, such as a 2×2 arrangement with two streams. It should be noted that the nomenclature 2×2 refers to base station 110 using two antennas for transmission to a subscriber station 114 using two antennas for receiving. Briefly, the transmission procedure may involve a channel-aware MU-MIMO procedure with CQI and vector feedback. Subscriber station 114 may perform singular value decomposition (SVD) of all the user channels in second-to-last subframe 214 of ith frame 210 to get the beam-forming vectors for each subscriber station 114. Then, the subscriber stations 114 feed back a Rank-1 CQI to base station 110. Also, each of the subscriber stations 114 will feed back its respective two main vectors to base station 110. Base station 110 then determines the selected beam-forming vectors, which in the 2×2 case comprises two vectors, from the subscriber station 114 having the best Rank-1 CQI value. Base station 110 may then broadcast in the last subframe 216 of the ith frame 210 the selected vectors from the subscriber station 114 having the best Rank-1 CQI value to all subscriber stations 114. Then, for Rank-2 CQI feedback in last subframe 216 of ith frame 210, each subscriber station calculates the Rank-2 CQIs, which in the present case may comprise two Rank-2 CQIs, by using the broadcasted vectors received from base station 110. Subscriber stations 114 may then feed back calculated two CQIs to base station 110. Upon receipt thereof, base station 110 may determine the pairing users based on scheduling criteria and/or MIMO mode/rank according to the Rank-1/Rank-2 CQIs base station 100 received from subscriber stations 114. In the event that Rank-1 mode or the same user is allocated to two streams over the same resource block (RB), then base station 110 may elect to use single-user MIMO transmission. Otherwise, multi-user transmission is selected.

In one or more embodiments, a more detailed transmission procedure for the channel-aware MU-MIMO scheme 200 of FIG. 2 may be as follows. In the second-to-last subframe 214 of the ith frame 210, for the uplink (UL) transmission from subscriber stations 114 to base station 110, each subscriber station 114 feeds back one Rank-1 CQI value to base station 110 for the rank adaptation based on the channel information for itself, on which the SVD decomposition may be based. In the Rank-1 CQI calculation, there is no interference existing from the second stream. Each subscriber station then feeds back its two main vectors, or beam-forming matrix, from its respective SVD decomposition over its own channel matrix to base station 110.

Next, in the last subframe 216 of the ith frame 210, for the downlink (DL) transmission from base station 110 to the subscriber stations 114, base station 110 compares all of the Rank-1 CQIs received from each of the subscriber stations 114 and determines which of the subscriber stations 114 has the best Rank-1 CQI value. Base station 110 then may determine a selected beam-forming matrix comprising two main beam-forming vectors from the subscriber station 114 having the best Rank-1 CQI value. Base station 110 then broadcasts the selected beam-forming matrix to all of the subscriber stations 114 in MIMO system 100.

For the subsequent uplink transmission, each of the subscriber stations then calculates the Rank-2 CQIs, which may comprise two Rank-2 CQIs in the two stream case, by using the beam-forming matrix vectors, in this case two vectors, and then feeds back the two calculated CQIs to base station 110. In one or more embodiments, the Rank-2 CQIs may be calculated with an interference-aware minimum mean squared error (MMSE) receiver at the subscriber stations 114. Each subscriber station 114 then feeds back two Rank-2 CQIs values to base station 10 for user pairing.

Next, in the first subframe 218 of the (i+1)the frame 212, the next frame, for the downlink transmission, base station 110 may determine the pairing subscriber stations 114 based on scheduling criteria for MU-MIMO and/or based on MIMO mode/rank according to the Rank-1/Rank-2 CQIs received previously from subscriber stations 114. Base station 110 may then start to transmit data by using the precoding vectors follows. If the value of the Rank-1 CQI is greater than the single-user Rank-2 CQIs and/or the multi-user Rank-2 CQIs, base station 110 selects the SU-MIMO Rank-1 mode for data transmission. In this case, base station 110 will transmit one stream with the first vector from broadcasted beam-forming matrix for the selected subscriber station 114. This selected subscriber station 114 corresponds to the highest-valued Rank-1 CQI compared with the SU-MIMO Rank-2 CQIs and/or MU-MIMO Rank-2 CQIs.

Otherwise, in the event the single-user Rank-2 CQI greater than the single-user Rank-1 CQI and/or the multi-user Rank-2 CQIs, base station 110 selects the SU-MIMO Rank-2 mode for data transmission. In this case, base station 110 will transmit two streams with the two vectors from the broadcasted beam-forming matrix for the selected subscriber station 114. This selected subscriber station 114 corresponds to the highest-valued SU Rank-2 CQIs compared with the SU Rank-1 CQI and/or MU Rank-2 CQIs.

Otherwise, if neither of the above comparisons is valid, then base station 110 selects the MU-MIMO Rank-2 mode for data transmission. In this case, base station 110 will transmit two streams with the two beam-forming vectors from the broadcasted beam-forming matrix for the selected two different subscriber stations. These two selected subscriber stations 114 will have the highest-valued MU Rank-2 CQIs, based on a summation over two different subscriber stations 114, compared with the SU Rank-1 CQI and/or the SU Rank-2 CQIs.

In one or more embodiments, the channel-aware MU-MIMO scheme 200 shown in FIG. 2 may be extended to a higher number of streams, more than two streams, and a higher number of antenna configurations, for example, a 4×2 antenna configuration in which base station 110 may have four antennas and subscriber stations 114 may have two antennas, or a 4×4 antenna configuration in which base station 110 may have four antennas and subscriber stations 114 may have four antennas, and so on. In such extensions, the difference may comprise the number of feedback beam forming vectors and CQIs used. Under the higher stream number/higher antenna configuration, there will be corresponding feedback number for the beam-forming vectors and CQIs. For example, for the case of four streams over a 4×4 antenna configuration there will be four beam-forming vectors for broadcasting and 4 CQIs for the user pairing for multiple users in MIMO system 100. These are, however, merely examples of how multiple streams and/or higher number of antennas may be implemented, and the scope of the claimed subject matter is not limited in these respects.

Figure 3:
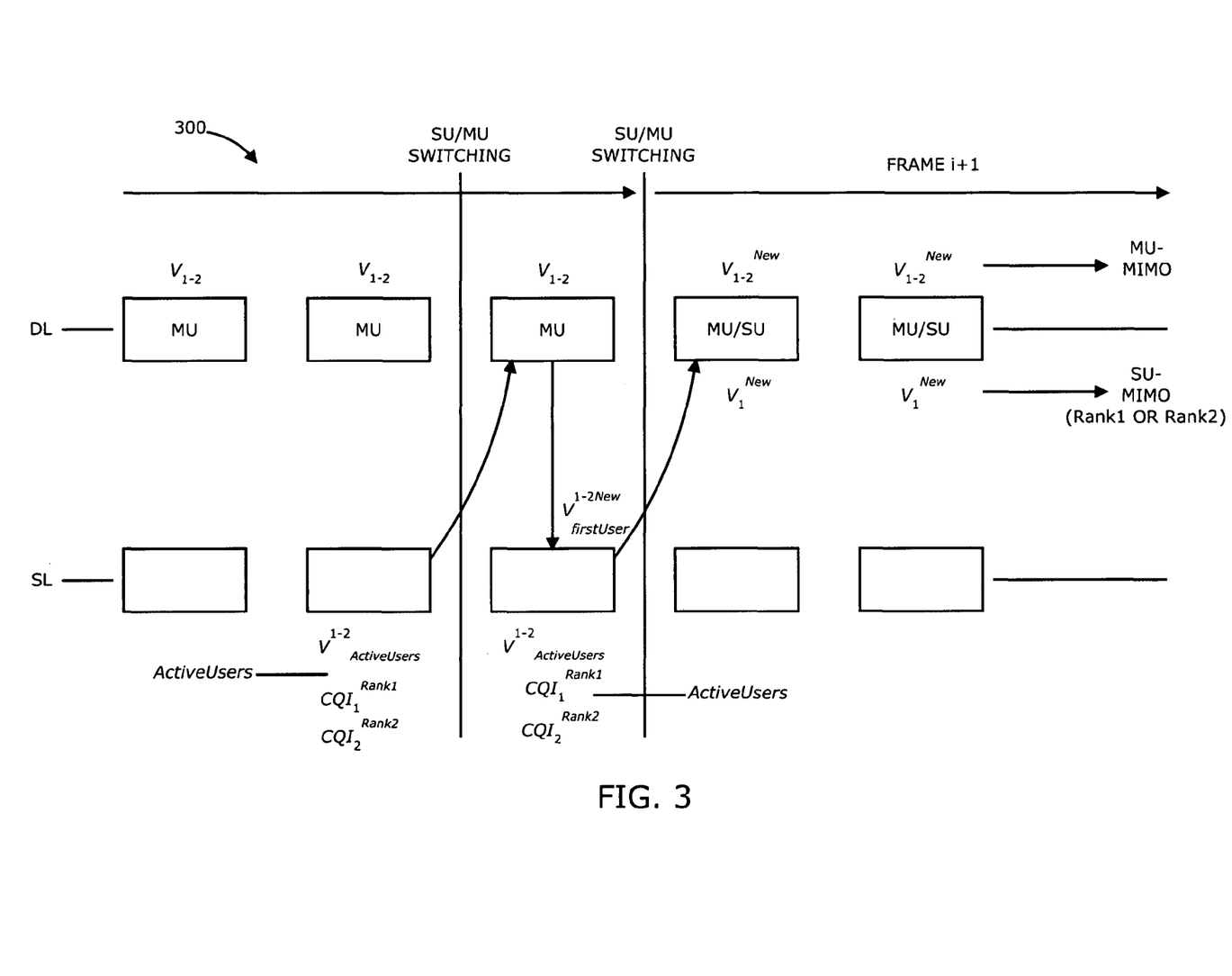
FIG. 3 is a diagram of a MU-MIMO transmission scheme using feedback of a channel quality indicator and vector (CQI/TV) with no downsampling in accordance with one or more embodiments.

Referring now to FIG. 3, a diagram of a MU-MIMO transmission scheme using feedback of a channel quality indicator and vector (CQIN) with no downsampling in accordance with one or more embodiments will be discussed. In the channel-aware MU-MIMO scheme 300 of FIG. 3, no downsampling is employed in the frame level. In one particular embodiment, the frame size is 5 milliseconds, although the scope of the claimed subject matter is not limited in this respect. As shown in FIG. 3, for each subframe every subscriber station 114 may feed back the same contents to base station 110, for example, each subscriber station 114 will feedback one CQI value based at least in part on the latest channel information. Each subscriber station 114 will calculate the two Rank-2 CQIs based at least in part on the broadcasted two or more beam-forming vectors received from base station 110, and then feedback the Rank-2 CQIs back to base station 110.

In the next subframe, base station 110 will select two new beam-forming vectors from the subscriber stations 114 having the highest-valued Rank-1 CQI for broadcasting. Base station 110 will transmit the data by the selected MIMO mode, either a SU-MIMO mode or a MU-MIMO mode, and use the selected beam-forming vector for precoding over the data. In one or more embodiments, the feedback over the whole band within one subframe may be based at least in part on a Best-M algorithm to reduce the feedback overhead. The beam-forming vector may also be utilized jointly with CQI feedback based at least in part on a Best-M algorithm. Such an embodiment may be implemented via a stream-line mode. Each subframe may have the same feedback overhead, and each subframe may implement switching between an SU-MIMO mode and an MU-MIMO mode, between Rank-1 and Rank-2, and so on, although the scope of the claimed subject matter is not limited in these respects.

Figure 4:
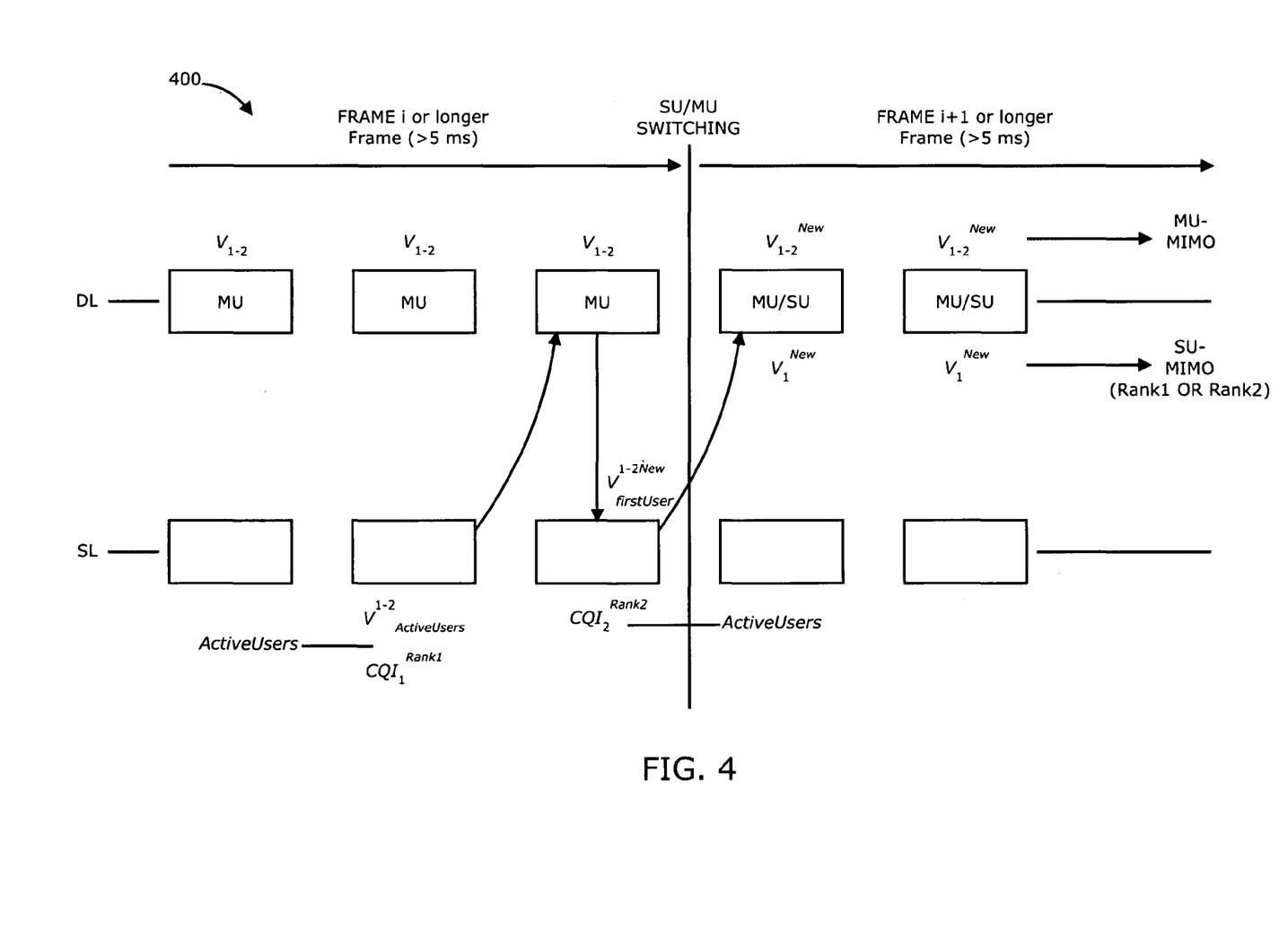
FIG. 4 is a diagram of a MU-MIMO transmission scheme using feedback of a channel quality indicator and vector (CQI/V) with downsampling in accordance with one or more embodiments.

Referring now to FIG. 4, a diagram of a MU-MIMO transmission scheme using feedback of a channel quality indicator and vector (CQI/V) with downsampling in accordance with one or more embodiments will be discussed. In the channel-aware MU-MIMO scheme 400 of FIG. 4, downsampling may be used for feedback in the frame level. In one or more embodiments, the frame size may be 5 milliseconds or higher. MU-MIMO scheme 400 of FIG. 4 is substantially similar to MU-MIMO scheme 300 of FIG. 3, in which the difference may comprise the switching unit or switching period. Each frame of 5 ms or longer frames greater than 5 ms will feedback the same contents. For example, each subscriber station 114 will feedback one CQI based at least in part on the latest channel information. Each subscriber station 114 will calculate two Rank-2 CQIs based at least in part on the broadcasted two beam-forming vectors which will then be feedback to base station 110.

In the next frame of 5 ms or longer frames greater 5 ms, base station 110 will select two new beam-forming vectors from the subscriber station having the highest-value Rank-1 CQI for broadcasting. Base station 110 will transmit the data via the selected MIMO mode, either SU-MIMO or MU-MIMO, and use the selected beam-forming vector for precoding over the data. The feedback over the whole band within one frame of 5 ms or longer frames greater than 5 ms may be based at least in part on a Best-M algorithm to reduce the feedback overhead. The beam-forming vector also may be used jointly with CQI feedback based at least in part on a Best-M algorithm. Such a case may be implemented via stream-line mode. Each frame of 5 ms or longer frames greater than 5 ms will have the same feedback overhead, and each frame of 5 ms or longer frames greater than 5 ms may have the switching between SU-MIMO and MU-MIMO; between Rank-1 and Rank-2, and so on, although the scope of the claimed subject matter is not limited in these respects.

In one or more embodiments, a channel-aware MU-MIMO scheme may implement scheduling and/or hybrid automatic repeat request (HARM) retransmission. For user scheduling for channel-aware MU-MIMO, user scheduling user scheduling in base station may be based at least in part on principles such as user orthogonality or the maximization of proportional fairness metric, and so on. In user scheduling, base station 110 will calculate the PF metric based at least in part on the SU Rank-1, SU Rank-2 and/or MU Rank-2 CQIs, and/or based at least in part on criteria to select out one MIMO mode for transmission. User pairing may then be determined.

For HARQ implemented in a channel-aware MU-MIMO scheme, HARQ retransmission could be implemented as an asynchronous mode or a synchronous mode. A non-blanking/blanking HARQ mode may be utilized for a channel-aware MU-MIMO scheme in which MU-MIMO will have two streams for transmission even if MIMO system 100 is undergoing retransmission. For example, in the case in which two data streams are supported, in the event there are two streams transmitting for MU-MIMO, one stream having an error would be retransmitted for the next transmission time. The other correct stream would be transmitted with new data in the next transmission time. The precoding vector used for new data and retransmission may be the latest beam-forming vectors from the MU-MIMO scheduling.

In one or more embodiments of MU-MIMO, mode/rank adaptation may be utilized to keep the link performance even if the channel is changing. The changing mode could be implemented for both flexible and/or semi-static solutions. For the flexible adaptation mode, subscriber stations will feed back CQI values of all adaptable ranks/modes, and then base station 110 will collect all the information for mode/rank determination. The changing could be implemented at a frame-by-frame level. Such a changing mechanism may have the sufficient performance with higher feedback overhead. For semi-static adaptation, subscriber stations 114 will request adaptation when a subscriber station 114 notices a channel change, and then base station 110 decides the needed adaptation. In such an arrangement, the frequency may change relatively slowly, however, using a lesser amount of feedback overhead.

In one or more embodiments, the channel-aware MU-MIMO scheme may utilize the downlink transmission for pilot signal measurement and/or detection. Pilots for measurement may be implemented, for example from a scattered common pilot, a midamble, reference signals to calculate out the MIMO CQI feedback, such as channel quality indicator (CQI), control sequence indicator (CSI), power margin indicator (PMI), codebook index, and so on. Where pilots are used for demodulation, a channel-aware MU-MIMO scheme may utilize a dedicated, precoded pilot for the data detection to save the pilot overhead, although the scope of the claimed subject matter is limited in these respects.

Figure 5:
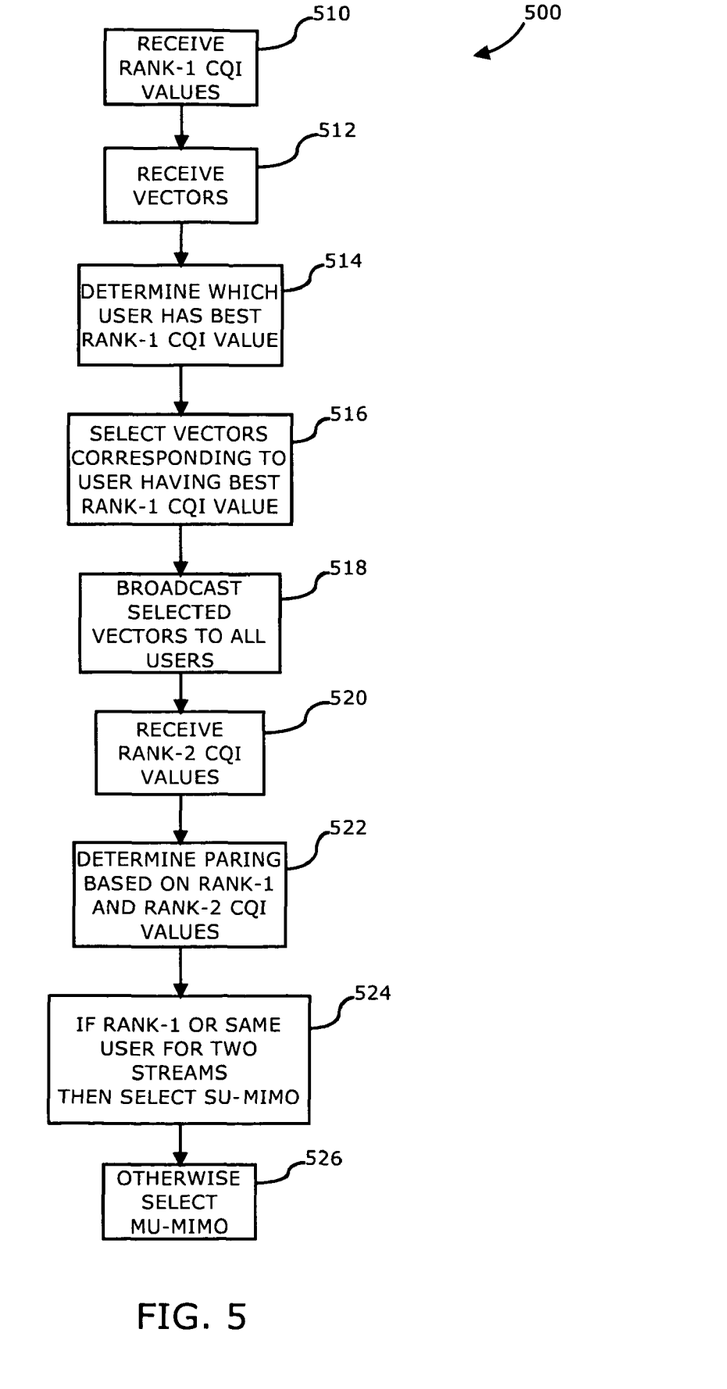
FIG. 5 is a flow diagram of a method for unifying a multi-user MIMO scheme with a single-user MIMO scheme in accordance with one or more embodiments.

Referring now FIG. 5, a flow diagram of a method for unifying a multi-user MIMO scheme with a single-user MIMO scheme in accordance with one or more embodiments will be discussed. Method 500 of FIG. 5 comprises one particular order of an SU-MIMO and MU-MIMO scheme, however, the method 500 may comprise other orders, and/or greater or fewer blocks, than shown in FIG. 5, and the scope of the claimed subject matter is not limited in this respect. At block 510, base station 110 receives Rank-1 CQI values from one or more subscriber stations 114, which may be referred to generally as users. At block 512, base station 110 receives two or more vectors from the respective subscriber stations corresponding to a beam-forming matrix codebook. Base station 110 then determines at block 514 which of the users as the best Rank-1 CQI value. Base station 110 then selects the vectors corresponding to the user having the best Rank-1 CQI value at block 516. Using the vectors from the user having the best Rank-1 CQI value, base station 110 broadcasts the vectors to all the users at block 518. The users will then calculate Rank-2 CQI values by using the broadcasted vectors and then feeds back the Rank-2 CQI values which are received by base station 110 at block 520. Base station 110 then determines user pairing based at least in part on the Rank-2 CQI values at block 522 by comparing the Rank-1 and Rank-2 values received from the subscriber stations 114. If base station 110 determines at block 524 if a Rank-1 CQI value is the best of the CQI values, or if the same user is allocated to two or more streams, then base station 110 selects single-user MIMO operation. Otherwise, if base station determines at block 526 two or more users in combination have the best Rank-2 CQI values, base station 110 selects multi-user MIMO operation.

Although the claimed subject matter has been described with a certain degree of particularity, it should be recognized that elements thereof may be altered by persons skilled in the art without departing from the spirit and/or scope of claimed subject matter. It is believed that the subject matter pertaining to a channel-aware multiple-user MIMO scheme unified with single-user closed-loop MIMO and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
   in an uplink transmission, receiving a Rank-1 channel quality indicator values from one or more subscriber stations, the channel quality indicator values being based at least in part on channel information;
   in an uplink transmission, receiving two or more vectors from the one or more subscriber stations;
   determining which of the one or more subscriber stations has a best Rank-1 channel quality indicator value;
   determining a beam-forming matrix based at least in part on the two or more vectors received from the subscriber station determined to have the best Rank-1 channel quality indicator value;
   in a downlink transmission, broadcasting to all of the subscriber stations the beam-forming matrix corresponding to the subscriber station determined to have the best Rank-1 channel quality indicator; and
   in an uplink transmission, receiving Rank-2 channel quality indicator values from the one or more subscriber stations;
   if a Rank-1 channel quality indicator value is greater than the Rank-2 channel quality indicator values from single subscriber stations or greater than the Rank-2 channel quality indicator values from multiple subscriber stations, then:
   selecting a single-user multiple-input, multiple-output Rank-1 mode for data transmission; and
   transmitting one data stream using the Rank-1 vectors for beam forming corresponding to the subscriber station having the best Rank-1 channel quality indicator value.

2. A method as claimed in claim 1, further comprising:
   in an uplink transmission, receiving the Rank-2 channel quality indicator values from the one or more subscriber stations;
   if a Rank-2 channel quality indicator value is greater than a Rank-1 channel quality indicator value from a single subscriber station or greater than a Rank-2 channel quality indicator value from multiple subscriber stations, then:
   selecting a single-user multiple-input, multiple-output Rank-2 mode for data transmission; and
   transmitting two data streams using the beam-forming matrix for the subscriber station having the best Rank-2 channel quality indicator value.

3. A method as claimed in claim 1, further comprising:
   in an uplink transmission, receiving the Rank-2 channel quality indicator values from the one or more subscriber stations;
   if two or more subscriber stations have the best Rank-2 channel quality indicator values, then:
   selecting a multi-user multiple-input, multiple-output Rank-2 mode for data transmission; and
   transmitting two data streams using the beam-forming matrices for the two or more subscriber stations having the best Rank-2 channel quality indicator values.

4. A method as claimed in claim 1, wherein the channel quality indicator values are based at least in part on a singular value decomposition.

5. A method as claimed in claim 1, wherein the channel quality indicator values are based at least in part on an assumption of no interference between two or more streams.

6. A method as claimed in claim 1, wherein said receiving a Rank-1 channel quality indicator values from one or more subscriber stations and said receiving Rank-2 channel quality indicator values from the one or more subscriber stations occurs in each subframe.

7. A method as claimed in claim 1, wherein said receiving a Rank-1 channel quality indicator values from one or more subscriber stations and said receiving Rank-2 channel quality indicator values from the one or more subscriber stations occurs in each subframe based at least in part on a Best-M calculation to reduce feedback overhead from the one or more users.

8. An article of manufacture comprising a non-transitory storage medium having instructions stored thereon that, if executed, result in:
- in an uplink transmission, receiving a Rank-1 channel quality indicator values from one or more subscriber stations, the channel quality indicator values being based at least in part on channel information;
- in an uplink transmission, receiving two or more vectors from the one or more subscriber stations;
- determining which of the one or more subscriber stations has a best Rank-1 channel quality indicator value;
- determining a beam-forming matrix based at least in part on the two or more vectors received from the subscriber station determined to have the best Rank-1 channel quality indicator value; and
- in a downlink transmission, broadcasting to all of the subscriber stations the beam-forming matrix corresponding to the subscriber station determined to have the best Rank-1 channel quality indicator; and in an uplink transmission, receiving Rank-2 channel quality indicator values from the one or more subscriber stations;
- if a Rank-1 channel quality indicator value is greater than the Rank-2 channel quality indicator values from single subscriber stations or greater than the Rank-2 channel quality indicator values from multiple subscriber stations, then:
- selecting a single-user multiple-input, multiple-output Rank-1 mode for data transmission; and
- transmitting one data stream using the Rank-1 vectors for beam forming corresponding to the subscriber station having the best Rank-1 channel quality indicator value.

9. An article of manufacture as claimed in claim 8, further comprising:
- in an uplink transmission, receiving the Rank-2 channel quality indicator values from the one or more subscriber stations;
- if a Rank-2 channel quality indicator value is greater than a Rank-1 channel quality indicator value from a single subscriber station or greater than a Rank-2 channel quality indicator value from multiple subscriber stations, then:
- selecting a single-user multiple-input, multiple-output Rank-2 mode for data transmission; and
- transmitting two data streams using the beam forming matrix for the subscriber station having the best Rank-2 channel quality indicator value.

10. An article of manufacture as claimed in claim 8, further comprising:
- in an uplink transmission, receiving the Rank-2 channel quality indicator values from the one or more subscriber stations;
- if two or more subscriber stations have the best Rank-2 channel quality indicator values, then:
- selecting a multi-user multiple-input, multiple-output Rank-2 mode for data transmission; and
- transmitting two data streams using the beam-forming matrices for the two or more subscriber stations having the best Rank-2 channel quality indicator values.

11. An article of manufacture as claimed in claim 8, wherein the channel quality indicator values are based at least in part on a singular value decomposition.

12. An article of manufacture as claimed in claim 8, wherein the channel quality indicator values are based at least in part on an assumption of no interference between two or more streams.

13. An article of manufacture as claimed in claim 8, wherein said receiving a Rank-1 channel quality indicator values from one or more subscriber stations and said receiving Rank-2 channel quality indicator values from the one or more subscriber stations occurs in each subframe.

14. An article of manufacture as claimed in claim 8, wherein said receiving a Rank-1 channel quality indicator values from one or more subscriber stations and said receiving Rank-2 channel quality indicator values from the one or more subscriber stations occurs in each subframe based at least in part on a Best-M calculation to reduce feedback overhead from the one or more users.

15. A base station, comprising:
- a radio-frequency transceiver coupled to an antenna; and
- a baseband processor couple to said radio-frequency transceiver, wherein the baseband processor is configured to:
  - in an uplink transmission, receiving a Rank-1 channel quality indicator values from one or more subscriber stations, the channel quality indicator values being based at least in part on channel information;
  - in an uplink transmission, receiving two or more vectors from the one or more subscriber stations;
  - determining which of the one or more subscriber stations has a best Rank-1 channel quality indicator value;
  - determining a beam-forming matrix based at least in part on the two or more vectors received from the subscriber station determined to have the best Rank-1 channel quality indicator value; and
  - in a downlink transmission, broadcasting to all of the subscriber stations the beam-forming matrix corresponding to the subscriber station determined to have the best Rank-1 channel quality indicator, and
- the baseband processor is further configured to:
  - in an uplink transmission, receiving Rank-2 channel quality indicator values from the one or more subscriber stations;
  - if a Rank-1 channel quality indicator value is greater than the Rank-2 channel quality indicator values from single subscriber stations or greater than the Rank-2 channel quality indicator values from multiple subscriber stations, then:
  - selecting a single-user multiple-input, multiple-output Rank-1 mode for data transmission; and
  - transmitting one data stream using the Rank-1 vectors for beam forming corresponding to the subscriber station having the best Rank-1 channel quality indicator value.

16. A base station as claimed in claim 15, wherein the baseband processor is further configured to:
- in an uplink transmission, receiving the Rank-2 channel quality indicator values from the one or more subscriber stations;
- if a Rank-2 channel quality indicator value is greater than a Rank-1 channel quality indicator value from a single subscriber station or greater than a Rank-2 channel quality indicator value from multiple subscriber stations, then:
- selecting a single-user multiple-input, multiple-output Rank-2 mode for data transmission; and
- transmitting two data streams using the beam-forming matrix for the subscriber station having the best Rank-2 channel quality indicator value.

17. A base station as claimed in claim 15, wherein the baseband processor is further configured to:
  in an uplink transmission, receiving the Rank-2 channel quality indicator values from the one or more subscriber stations;
  if two or more subscriber stations have the best Rank-2 channel quality indicator values, then:
    selecting a multi-user multiple-input, multiple-output Rank-2 mode for data transmission; and
    transmitting two data streams using the beam-forming matrices for the two or more subscriber stations having the best Rank-2 channel quality indicator values.

* * * * *

UNITED STATES PATENT AND TRADEMARK OFFICE
CERTIFICATE OF CORRECTION

PATENT NO. : 8,179,844 B2
APPLICATION NO. : 12/183317
DATED : May 15, 2012
INVENTOR(S) : Hongming Zheng et al.

It is certified that error appears in the above-identified patent and that said Letters Patent is hereby corrected as shown below:

On the Title page, Item (57) in "Abstract", line 4, delete "preceding" and insert -- precoding --, therefor.

In column 9, line 16-22,
In Claim 8, delete "in a downlink transmission, broadcasting to all of the subscriber stations the beam-forming matrix corresponding to the subscriber station determined to have the best Rank-1 channel quality indicator; and in an uplink transmission, receiving Rank-2 channel quality indicator values from the one or more subscriber stations;" and
insert -- in a downlink transmission, broadcasting to all of the subscriber stations the beam-forming matrix corresponding to the subscriber station determined to have the best Rank-1 channel quality indicator; and
in an uplink transmission, receiving Rank-2 channel quality indicator values from the one or more subscriber stations; --, therefor.

Signed and Sealed this
Twenty-first Day of August, 2012

David J. Kappos
*Director of the United States Patent and Trademark Office*